United States Patent [19]
Okumura et al.

[11] Patent Number: 5,402,525
[45] Date of Patent: Mar. 28, 1995

[54] APPARATUS AND METHOD FOR AUTOMATICALLY CREATING MEMBERSHIP FUNCTIONS

[75] Inventors: Akira Okumura, Kyoto; Tsutomu Ishida, Suita, both of Japan

[73] Assignee: Omron Corporation, Kyoto, Japan

[21] Appl. No.: 102,712

[22] Filed: Aug. 6, 1993

[30] Foreign Application Priority Data

Aug. 26, 1992 [JP] Japan ................................. 4-248967

[51] Int. Cl.⁶ ............................................. G06F 15/00
[52] U.S. Cl. ......................................... 395/51; 395/3; 395/61
[58] Field of Search ....................... 395/3, 51, 61, 900, 395/76

[56] References Cited

U.S. PATENT DOCUMENTS

| | | | |
|---|---|---|---|
| 5,229,955 | 7/1993 | Nishiwaki et al. | 395/900 |
| 5,230,228 | 7/1993 | Nakano et al. | 395/900 |
| 5,233,682 | 8/1993 | Abe et al. | 395/900 |
| 5,239,620 | 8/1993 | Yamakawa et al. | 395/900 |
| 5,245,698 | 9/1993 | Matsunaga | 395/900 |
| 5,251,288 | 10/1993 | Nomura et al. | 395/900 |
| 5,253,332 | 10/1993 | Kumamoto | 395/900 |

FOREIGN PATENT DOCUMENTS 537350  4/1983  European Pat. Off. .

OTHER PUBLICATIONS

"Proceedings of VLSI and Computers," Proebster, et al., IFirst International Conference On Computer Technology, Systems and Applications, West Germany, 11-15 May 1987, pp. 847-850.

*Primary Examiner*—David D. Knepper
*Attorney, Agent, or Firm*—Dickstein, Shapiro & Morin

[57] ABSTRACT

Membership functions are capable of being created with ease even by a person who is not an expert or skilled individual. Data Ai~Bi sensed by sensors 11~13 and synthesized data Mi are stored in a memory device 31 in correlation with identification codes Di of objects. The results of comparing the "tastiness" of an object Di with that of an object Dj are entered from an input unit 15 and stored in the memory device 31. An evaluating unit 32 arrays the results of comparison in accordance with inequality symbols and assigns evaluation values to these results in the order of the array. A histogram creating unit 33 generates a histogram by plotting each item of input data Ai~Mi along a horizontal axis and plotting the corresponding evaluation values along a vertical axis. Whether or not a function obtained by connecting the peaks of the histogram is appropriate as a basic function for creation of a membership function is judged by a judging unit 34 from the viewpoint of whether the function has a unique peak or a variance about the peak that is small. A function judged to be appropriate is normalized by a generating unit 35, thereby generating a membership function.

5 Claims, 3 Drawing Sheets

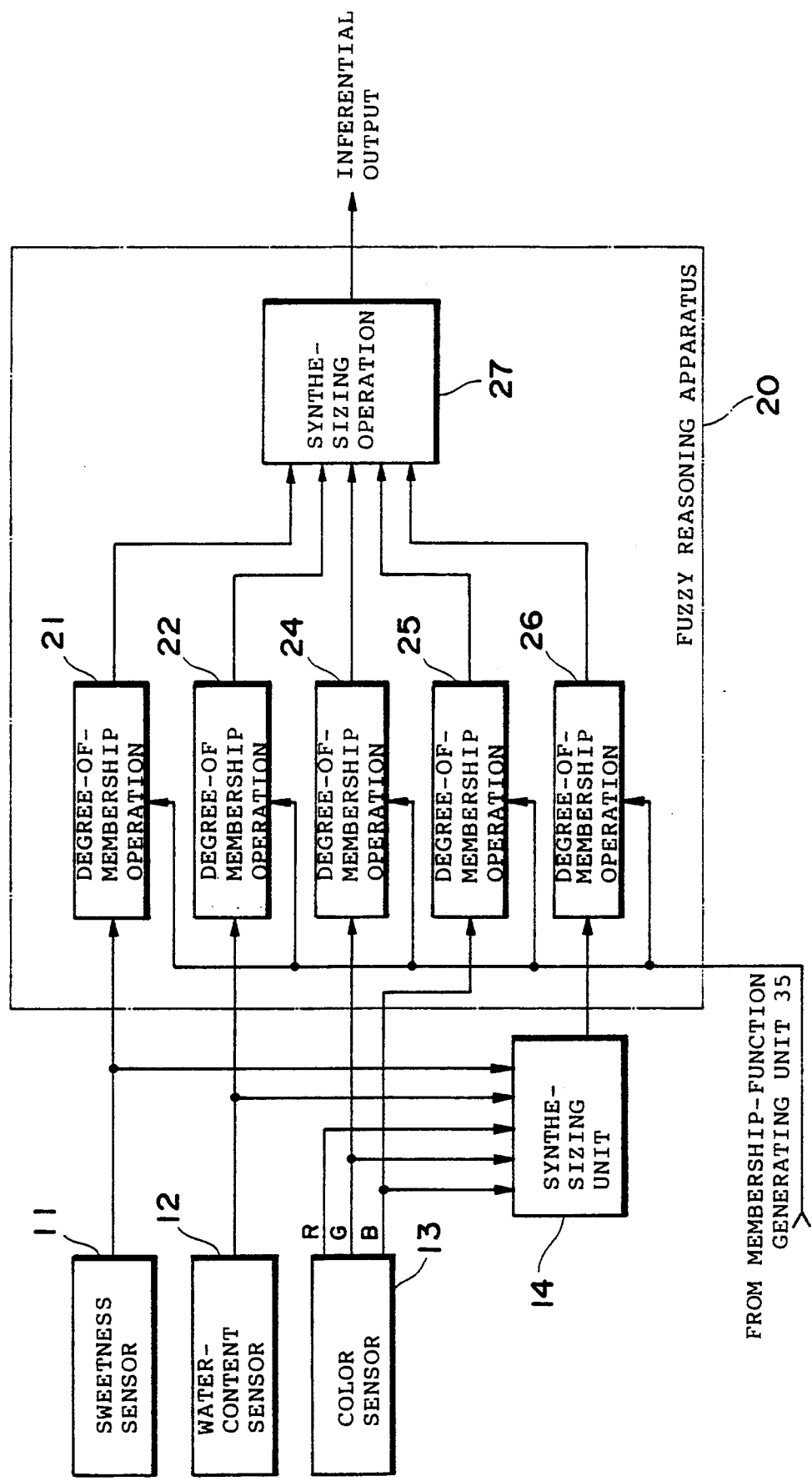

APPARATUS AND METHOD FOR AUTOMATICALLY CREATING MEMBERSHIP FUNCTIONS

BACKGROUND OF THE INVENTION

1. Field of the Invention

This invention relates to an apparatus and method for automatically creating membership functions.

2. Description of the Related Art

In a conventional method of setting membership functions, first an input variable (characteristic axis) suitable for executing fuzzy reasoning is selected and then the user creates a membership function from a distribution of input values relating to this input variable.

With such a conventional method of setting a membership function, however, the membership function cannot be created unless the user is a skilled individual or a technician possessing adequate knowledge. This means that the general user cannot utilize a fuzzy reasoning apparatus or finds the apparatus difficult to use. In particular, in view of the fact that input-variable selection is difficult, it is also difficult to obtain a distribution of input data serving as the basis of a membership function.

For example, in a case where "tastiness" is evaluated, whether sweetness alone should be the input variable (characteristic axis), whether other factors such as color and water content should also be considered, and the relationship between tastiness and sweetness, color and moisture often are entirely unknown.

SUMMARY OF THE INVENTION

An object of the present invention is to provide an apparatus and method whereby membership functions can be set easily even if the user is not an expert or skilled individual.

In accordance with the present invention, the foregoing object is attained by providing an apparatus for automatically creating membership functions, comprising first input means for entering objective numerical-value data regarding an object along with identification codes of this data, first memory means for storing, in correlation with the identification codes, the numerical-value data entered by the first input means, second input means for entering results of subjective judgment regarding the object, these results being entered as comparative data represented using the identification codes of the numerical-value data entered by the first input means, second memory means for storing the comparative data entered by the second input means, evaluating means for assigning evaluation values in correspondence with the identification codes in accordance with a ranking based upon the comparative data stored in the second memory means, means for creating a histogram by arraying the numerical-value data, which has been stored in the first memory means, on a horizontal axis in accordance with the numerical values, and plotting, along a vertical axis, the evaluation values assigned to correspond to the identification codes associated with the numerical-value data, judging means for judging whether the histogram created by the histogram creating means is appropriate as a basis for a membership function, and membership-function generating means for generating a membership function based upon a histogram judged to be appropriate by the judging means.

There are a variety of data identification codes. In a case where objects are a number of physical objects of the same type, the identification numbers of the objects would be the identification codes of the data. If an object is a single object or device and a series of data is obtained with the passage of time, the times at which the data is obtained would be the identification codes of the data obtained at these times. In any case, the identification codes are used as a means of associating the numerical-value data entered by the first input means and the comparative data entered by the second input means in correspondence with the numerical-value data. The identification codes are employed in order to express the comparative data entered by the second input means.

In an embodiment of the present invention, the first input means includes a plurality of sensors for performing measurements with regard to attributes of a plurality of objects. In this case, the histogram creating means creates a histogram for every item of data obtained from the plurality of sensors.

In a case where a plurality of the first input means are provided, as in the manner of the sensors mentioned above, a plurality of the second input means may be provided, in correspondence with respective ones of the plurality of first input means, for entering the results of subjective judgment relating to the numerical-value data entered by the first input means. The histogram creating means in this case creates the histogram based upon mutually corresponding input data from the first input means and comparative data from the second input means.

In a case where a plurality of first input means are provided, the apparatus may be further provided with means for creating synthesized numerical-value data based upon at least two types of numerical-input value from the plurality of first input means. The histogram creating means also creates a histogram using the synthesized numerical-value data.

According to the present invention, the foregoing object is attained by providing a method of automatically creating membership functions comprising the steps of entering objective numerical-value data regarding an object along with identification codes of this data, storing, in correlation with the identification codes, the entered numerical-value data, entering results of subjective judgment regarding the object, these results being entered as comparative data represented using the identification codes of the entered numerical-value data, storing the entered comparative data, assigning evaluation values in correspondence with the identification codes in accordance with a ranking based upon the comparative data, creating a histogram by arraying the numerical-value data on a horizontal axis in accordance with the numerical values and plotting, along a vertical axis, the evaluation values assigned to correspond to the identification codes associated with the numerical-value data, judging whether the created histogram is appropriate as a basis for a membership function, and generating a membership function based upon a histogram judged to be appropriate.

In accordance with the present invention, whether or not the entered numerical-value data relates to an input variable or characteristic axis suited to the formation of a membership function is judged merely by entering the numerical-value data from the first input means and entering a subjective evaluation with regard to this numerical-value data from the second input means. When the entered numerical-value data has been judged to be appropriate, a membership function is created automatically in accordance with the entered data. Accordingly, membership functions can be set with ease even by a general user who is not an expert nor highly skilled individual.

The membership functions thus created are utilized in a fuzzy reasoning apparatus and method. The fuzzy reasoning apparatus has degree-of-membership operating means, in which are set respective ones of a plurality of membership functions created by the above-described apparatus for automatically creating membership functions, for calculating degrees of membership of data, which enter from corresponding sensors, in the membership functions, and synthesizing operating means for performing a prescribed synthesizing operation with regard to a plurality of degrees of membership obtained from the degree-of-membership operating means, and generating an inferential output.

A fuzzy reasoning method comprises the steps of setting respective ones of a plurality of membership functions created by the above-described method for automatically creating membership functions, calculating degrees of membership of data, which enter from corresponding sensors, in the membership functions, performing a prescribed synthesizing operation with regard to a plurality of degrees of membership obtained, and generating an inferential output.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a block diagram illustrating the electrical configuration of a fuzzy reasoning apparatus.

DESCRIPTION OF THE PREFERRED EMBODIMENT

Figure 1:
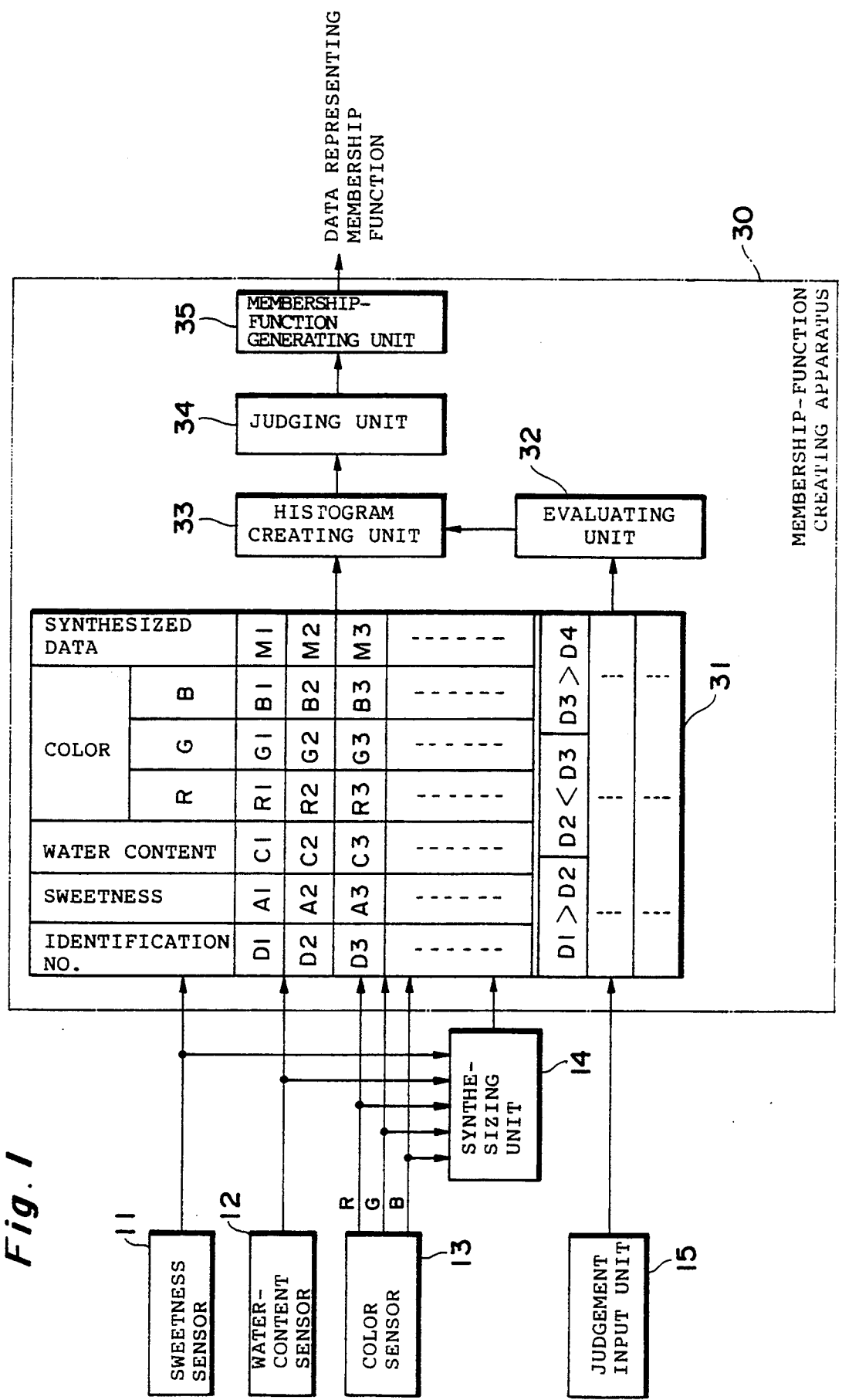
FIG. 1 is block diagram illustrating the electrical configuration of an apparatus for creating membership functions.

FIG. 1 is a block diagram illustrating the electrical configuration of an apparatus for creating membership functions.

A membership function in this embodiment is for evaluating the fuzzy linguistic information "tastiness". By what factors (attributes) the "tastiness" of fruits and other foods (subjects) should be evaluated is not well known. Accordingly, sweetness (sugar level), water content and color are selected for the time being. A sweetness sensor (a sugar-level meter, for example) 11, a water-content sensor 12 and a color sensor 13 are provided in order to sense sweetness, water content and color, respectively.

By way of example, a large number of fruits (the objects), namely oranges, are prepared and each is assigned a different identification number Di (i=1, 2, 3, . . . ).

A human being (the user) tastes an orange whose identification number is Di and an orange whose identification number is Dj and then judges which is more "tasty". Though this judgment is a subjective one, it is possible to make a comparative judgment as to which is more "tasty" by using such subjectivism subjective judgements. An input unit (such as a keyboard) 15 is provided in order to enter the result of the comparative judgment made by the user. If the user decides that orange Di is more tasty than orange Dj, the user enters the data Di>Dj from the input unit 15. If both oranges are equally tasty, the user enters the data Di=Dj.

With regard to the orange of identification number Di, sweetness data (sugar level) Ai sensed by the sweetness sensor 11, water-content data (percentage of water content) Ci sensed by the water-content sensor 12 and color-component data Ri, Gi, Bi of the colors red (R), green (G) and blue (B) sensed by the color sensor 13 are entered and stored in a memory device (e.g., a RAM or disk memory) 31 in correlation with the identification number Di. The identification number Di would be entered from the input unit 15 or from some other input device. The comparative data (Di>Dj, Di<Dj or Di=Dj), which is indicative of the comparison between the orange Di and another orange Dj (e.g., an orange tasted immediately before the orange Di), also is stored in the memory device 31.

In this embodiment, an input-data combining unit 14 is provided. The combining unit 14 selects at least two items of input data from among the input data obtained from the sensors 11, 12 and 13 and subjects the selected data to a prescribed operation to create synthesized data Mi. The input data to be selected and the method of operating upon the data are predetermined. For example, the product of the sweetness data Ai and water-content data Ci is calculated and the result is adopted as the synthesized data Mi. In other words, $$Mi = Ai \cdot Ci$$

When entry of the data regarding all of the objects (the oranges) prepared in advance is concluded, an evaluating unit 32 ranks all of the objects (identification numbers) based upon the results of judgment stored in the memory device 31 and assigns evaluation values to the objects. The ranking is performed as follows using inequality signs regarding the entered results of comparison:

$$\ldots D1 > D3 > D2 > \ldots > Di > \ldots > D4 \ldots$$

Though there are various methods of assigning evaluation values, the simplest method is to allocate numerical values of from 0 to 100 at an equal spacing. If there are 51 objects, 100 is assigned to the leftmost object ranked as set forth above, 0 is assigned to the rightmost object and the evaluation values 98, 96, 94, . . . , 6, 4, 2 are assigned to the objects between these two consecutively starting from the left side. Any method of assigning the evaluation values will suffice so long as the evaluation values assigned become successively larger or smaller in accordance with the sequence resulting from ranking.

Figure 2A:
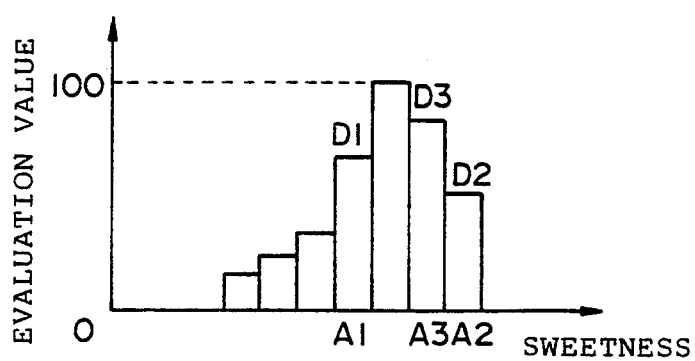
FIGS. 2a, 2b, 2c and 2d are graphs respectively illustrating an example of a histogram for creating a membership function, a function corresponding to FIG. 2a, an example of a function unsuitable for the creation of a membership function and a membership function created based upon the function of FIG. 2b.

A histogram creating unit 33 creates a histogram for each type of data using the respective data sensed by the sensors 11-13 and the synthesized data and the evaluation values provided by the evaluating unit 32. More specifically, the unit 33 creates a histogram by arraying the data along a horizontal axis in accordance with numerical values represented by this data and plotting the evaluation values assigned to the identification numbers of the data along a vertical axis. FIG. 2a illustrates an example of a histogram regarding sweetness. The data Ai sensed by the sweetness sensor 11 is arrayed along the horizontal axis and the corresponding evaluation values provided by the evaluating unit 32 are plotted along the vertical axis.

Figure 2B:
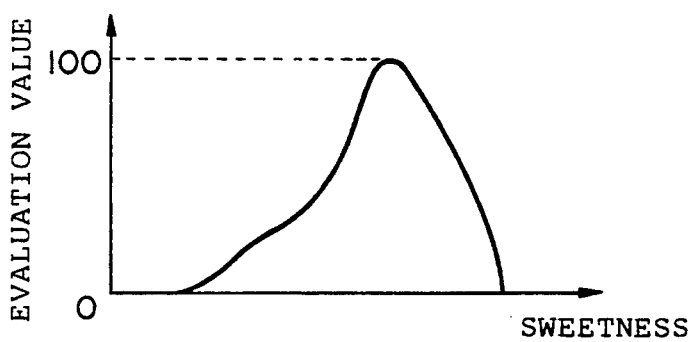

A judging unit 34 creates a function by connecting the peaks of the bar graphs in the histogram created by the histogram creating unit 33 and determines whether this function is appropriate as the basis of a membership function. FIG. 2b illustrates a function created from the histogram of FIG. 2a.

Figure 2C:
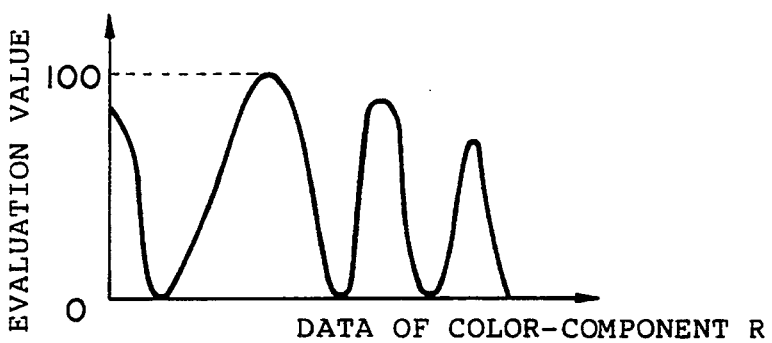

There are many criteria for judging whether a function of this kind is suitable as the basis of a membership function. For example, judgment can be rendered depending upon whether or not a function created from a histogram possesses a unique peak. A function having two or more peaks would be judged to be inappropriate. Further, variance about a peak value of a function created from a histogram may be found and, if the variance is smaller than a prescribed value, the function may be judged as being appropriate for the creation of a membership function. If the variance is found to be greater than the prescribed value, then the function would be judged as being inappropriate. The function illustrated in FIG. 2b is judged to be appropriate as the basis of membership-function creation. A function regarding the data of the color-component R shown in FIG. 2c would be judged to be inappropriate as the basis of membership-function creation.

Figure 2D:
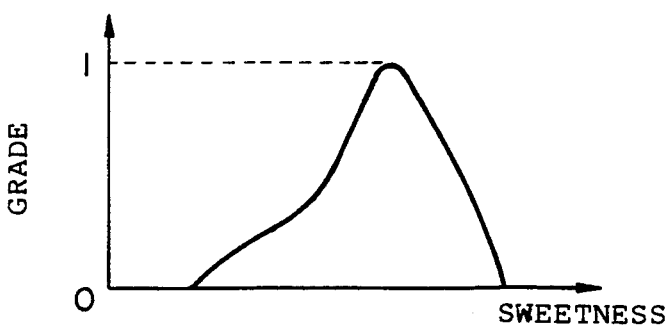

A membership-function generator 35 generates a membership function based upon the function judged to be appropriate by the judging unit 34. The generation of the membership function is carried out by normalizing the above-mentioned function over a range of from 0 to 1. FIG. 2d illustrates a membership function created based upon the function shown in FIG. 2b.

In this embodiment, comparative data regarding overall "tastiness" is provided by the input unit 15. However, it is permissible to enter "tastiness relating to sweetness", "tastiness from the standpoint of juiciness" and "degree to which the orange appears to be tasty from the standpoint of external color" for each item of data from the sensors 11 through 13. In this case, the histogram would be created using the comparative data provided for each item of sensor data and the sensor data corresponding to this comparative data, such as by creating a single histogram from the data of sensor 11 and the comparative data of "tastiness relating to sweetness". It should be noted that the units 32, 33, 34, 35 preferably are realized by a computer, or a part thereof, programmed so as to execute the processing operations of these units.

FIG. 3 illustrates an example of a fuzzy reasoning apparatus which executes fuzzy reasoning relating to "tastiness" using a membership function created in the manner described above.

A fuzzy reasoning apparatus 20 shown in FIG. 3 is provided with a plurality of degree-of-membership operation circuits 21, 22, 24, 25, 26 preset to created membership functions regarding sweetness, water content, color-sensor data G, B and synthesized data, respectively. A degree-of-membership operation circuit is not provided for data with regard to which a membership function is not created, as in the case of red color-component data R.

With regard to an object whose "tastiness" is unknown, sweetness, water content and the data of the color components G, B respectively sensed by the sweetness sensor 11, water-content sensor 12 and color sensor 13 are applied to the degree-of-membership operation circuits 21, 22, 24, 25, respectively, of the fuzzy reasoning apparatus 20. Synthesized data produced by the combining unit 14 based upon the data of sweetness, water content and color (R, G, B) is applied to the degree-of-membership operation circuit 26.

The degree-of-membership operation circuits 21, 22, 24, 25, 26 calculate the degrees of membership of the input data in the respective membership functions to which they have been set and apply the results of these calculations to a synthesizing operating circuit 27.

The synthesizing operating circuit 27 calculates the degree of "tastiness" such as by averaging the degrees of membership calculated by the degree-of-membership operation circuits 21, 22, 24, 25, 26 and delivers the degree of "tastiness" as an output signal. Examples of the operations that may be performed by the operating circuit 27 are multiplication, addition, MAX, MIN, etc.

It should be noted that the apparatus for creating membership functions and the fuzzy reasoning apparatus described above can be realized also by a programmed computer or by combining hardware circuitry.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for automatically creating membership functions, comprising:

first input means for entering objective numerical-value data regarding an object along with identification codes of this data;

first memory means for storing, in correlation with the identification codes, the numerical-value data entered by said first input means;

second input means for entering results of subjective judgment regarding the object, these results being entered as comparative data represented using the identification codes of the numerical-value data entered by said first input means;

second memory means for storing the comparative data entered by said second input means;

evaluating means for assigning evaluation values in correspondence with the identification codes in accordance with a ranking based upon the comparative data stored in said second memory means;

means for creating a histogram by arraying the numerical-value data, which has been stored in said first memory means, on a horizontal axis in accordance with the numerical values, and plotting, along a vertical axis, the evaluation values assigned to correspond to the identification codes associated with the numerical-value data;

judging means for judging whether the histogram created by said histogram creating means is appropriate as a basis for a membership function; and membership-function generating means for generating a membership function based upon a histogram judged to be appropriate by said judging means.

2. The apparatus according to claim 1, wherein said first input means is a plurality of sensors for performing measurements regarding a plurality of attributes of an object, and said histogram generating means creates a histogram for each item of data obtained from said plurality of sensors.

3. The apparatus according to claim 1, wherein a plurality of said first input means are provided, a plurality of the second input means are provided, in correspondence with respective ones of said plurality of first input means, for entering the results of subjective judgment relating to the numerical-value data entered by said first input means, and said histogram creating means creates a histogram based upon mutually corresponding input data from said first input means and comparative data from said second input means.

4. The apparatus according to claim 1, wherein a plurality of said first input means are provided, means are provided for creating synthesized numerical-value data based upon at least two types of numerical-input value from said plurality of first input means, and said histogram creating means creates a histogram using the synthesized numerical-value data.

5. A method of automatically creating membership functions comprising the steps of:
   entering objective numerical-value data regarding an object along with identification codes of this data;
   storing, in correlation with the identification codes, the entered numerical-value data;
   entering results of subjective judgment regarding the object, these results being entered as comparative data represented using the identification codes of the entered numerical-value data;
   storing the entered comparative data;
   assigning evaluation values in correspondence with the identification codes in accordance with a ranking based upon the comparative data;
   creating a histogram by arraying the numerical-value data on a horizontal axis in accordance with the numerical values and plotting, along a vertical axis, the evaluation values assigned to correspond to the identification codes associated with the numerical-value data;
   judging whether the created histogram is appropriate as a basis for a membership function; and
   generating a membership function based upon a histogram judged to be appropriate.

* * * * *